UNITED STATES PATENT OFFICE 2,100,047

PROCESS OF MANUFACTURING SOAP

Karl Braun, Berlin-Frohnau, and Hermann Plauson, Berlin, Germany

No Drawing. Application March 20, 1936, Serial No. 69,976. In Germany February 7, 1935

5 Claims. (Cl. 87—16)

The attempts to treat sulphite cellulose spent lye, which as is well known represents a cloudy, black liquid, in such a manner that it can be employed for the manufacture of soap have up to the present led to no satisfactory result. On the other hand, the employment of clear sulphite cellulose spent lye has very great advantages for many industries. In the first place, a clear soap is preferred by the consumer; further, a soap prepared with bleached sulphite spent lye, as has been ascertained, can also be used as a washing medium with sea-water. Moreover, the employment of such sulphite spent lye renders possible a considerable saving in fats, owing to the marked washing powder. Finally, relief would be afforded to the very troublesome matter of the disposal of waste products.

The present invention is based upon the sulphite cellulose spent lye being subjected to a chlorination and oxidation process. There is obtained under special conditions a reddish yellow clear sulphite spent lye. It has been found that technical chloride of lime can be used for these purposes if the reaction is carried out in colloid mills or similarly working rapidly-running grinding or beating machines, or if the mixture is heated and then treated in ordinary beating vats or similar devices with or without pressure. The reaction with chloride of lime, viz., 5–50% (in accordance with the quality of the chloride of lime, whether it is employed alone or with the addition of further gaseous chlorine, and calculated on the solid components of the sulphite spent lye, principally ligninsulfoacids) can be carried out with very slow stirring, as above. The chlorination can, however, be carried out in such a manner that the action of the chloride of lime is increased by the introduction of chlorine gas. Further it is possible to start with calcium hydroxide, and by the introduction of chlorine the formation of chloride of lime and its action may be obtained in one process. In the latter case care should be taken that the chlorine is introduced only until there is produced a weakly alkaline, or at most a neutral reaction is produced, and never an acid reaction. By means of such treatment the process is considerably accelerated and a more rapid action is produced.

After this the mass is made neutral or weakly acid with the help of an inorganic or organic acid and the calcium salts are separated in the well known manner. The latter are removed with the help of centrifuges or filter drums. With this form of execution of the employment of chloride of lime and/or chlorine there occurs a more or less strong conversion of the sulphite spent lye, and there is finally obtained a clear sulphite cellulose spent lye.

It has further been found that the sulphite spent lye which has been so treated can be given an increased lathering property if it is treated with ozonized air or with hydrogen peroxide and these substances are allowed to work in with good stirring. There then occurs a partial precipitation, after which the solution shows an extraordinary lathering capacity. The oxidation action in the direction of an increased lathering action is promoted by the addition of 0.1 to 1% of hypochlorous acid as a catalyzer.

In accordance with the present invention it has further been ascertained that for the purpose of decreasing cost it may in some cases, e. g., when the generation of steam is expensive, be advantageous to carry out a preliminary concentration. For this purpose the sulphite cellulose spent lye, which has been diluted and treated with chloride of lime, is added direct to baked gypsum, after neutralization with an acid which separates calcium, e. g., sulphuric acid, phosphoric acid, oxalic acid, and the like. In this way a great part of the water is removed by the cold process without special losses of sulphite cellulose substances. As is well known, 1 mol. of anhydrous gypsum binds 2 mols of water, which signifies that with 136 grams of gypsum 36 grams of water can be bound and the latter can therefore be withdrawn. This water can be driven out again in gypsum reducing kilns and the gypsum can be employed anew. In this manner this material can be used a number of times in the circulatory process.

The manufacture of clear soap wth the sulphite cellulose spent lye according to the present invention is carried out in the ordinary manner by the cold or hot process by means of stirring or rubbing into the soap—without or with the addition of substances preventing efflorescence in the form of poly-valent glycoles or polyglycoles and lastly monochlorohydrins or dichlorohydrins. The employment of the said substances in the manufacture of soap with sulphite spent lye as substances preventing efflorescence is included in the scope of this invention.

The quantitative proportions for the chemicals to be employed are dependent upon the nature of the crude lye, its composition, and its initial concentration and can therefore be altered in various directions.

We claim:—

1. A process of manufacturing clear soap with sulphite cellulose spent lye, which consists in chlorinating such lye, thereafter neutralizing the treated lye with an acid, then removing the precipitated matter to obtain clear lye, oxidizing the lye, dehydrating the same, and thereafter incorporating soap to give the completed product.

2. A process according to claim 1, in which while the spent lye is chlorinated free chlorine is introduced.

3. A process of manufacturing clear soap with sulphite cellulose spent lye, which consists in adding chloride of lime to such lye and agitating the same, introducing free chlorine thereinto, thereafter neutralizing the treated lye with an acid, removing the precipitated matter to obtain a clear liquid lye, oxidizing the lye, reducing the water content, and thereafter incorporating soap to give the completed product.

4. A process of manufacturing clear soap with sulphite cellulose spent lye, which consists in adding calcium hydroxide to such lye and agitating the same, introducing chlorine thereinto in sufficient quantities to render the mass weakly alkaline or substantially so, thereafter neutralizing the treated lye with an acid, separating out the precipitated matter to otbain a clear liquid lye, oxidizing the lye, reducing its water content, and thereafter incorporating soap to give the completed product.

5. A process of manufacturing clear soap with sulphite cellulose spent lye, which consists in chlorinating such lye with calcium chloride, neutralizing the treated lye with an acid, dehydrating the same by adding anhydrous gypsum thereto, separating out the solid matter to produce a clear liquid lye, and thereafter incorporating soap to give the completed products.

HERMANN PLAUSON.
KARL BRAUN.